(12) United States Patent
Saint-Jalmes

(10) Patent No.: US 9,630,720 B2
(45) Date of Patent: Apr. 25, 2017

(54) ARMREST AND SEAT ARRANGEMENT COMPRISING THE SAME

(71) Applicant: Airbus Defence and Space GmbH, Ottobrunn (DE)

(72) Inventor: Bruno Saint-Jalmes, Munich (DE)

(*) Notice: Subject to any disclaimer, the term of this patent is extended or adjusted under 35 U.S.C. 154(b) by 71 days.

(21) Appl. No.: 14/606,129

(22) Filed: Jan. 27, 2015

(65) Prior Publication Data

US 2015/0210395 A1    Jul. 30, 2015

(30) Foreign Application Priority Data

Jan. 28, 2014  (EP) .................................. 14152804

(51) Int. Cl.
*B64D 11/06*   (2006.01)
*B60N 2/46*    (2006.01)

(52) U.S. Cl.
CPC ............ *B64D 11/0644* (2014.12); *B60N 2/46* (2013.01); *B60N 2/464* (2013.01); *B60N 2/4626* (2013.01); *B64D 11/0646* (2014.12)

(58) Field of Classification Search
CPC ............ B64D 11/0644; B64D 11/0646; B60N 2/4626; B60N 2/46; B60N 2/464
See application file for complete search history.

(56) References Cited

U.S. PATENT DOCUMENTS

| 5,597,139 A * | 1/1997 | Beroth | B64D 11/0693 244/118.6 |
| 5,829,836 A * | 11/1998 | Schumacher | B64D 11/0693 244/118.6 |
| 6,003,927 A * | 12/1999 | Korber | B60N 2/464 296/37.8 |
| 7,748,769 B2 | 7/2010 | Sommer et al. | |
| 2004/0164577 A1* | 8/2004 | Shabana | B60N 2/0232 296/1.09 |
| 2009/0079228 A1* | 3/2009 | Sturt | B60N 2/464 296/153 |
| 2011/0043026 A1 | 2/2011 | Montalvo | |
| 2014/0217798 A1* | 8/2014 | Negusse | A47C 7/543 297/411.3 |
| 2014/0252821 A1* | 9/2014 | Friedlander | B60N 2/468 297/232 |
| 2016/0355265 A1* | 12/2016 | Shih | B64D 11/0644 |

FOREIGN PATENT DOCUMENTS

GB           2455130 A       6/2009

* cited by examiner

*Primary Examiner* — Valentina Xavier
(74) *Attorney, Agent, or Firm* — Leydig, Voit & Mayer, Ltd.

(57) ABSTRACT

An armrest for arrangement between two seats, especially two passenger seats of a vehicle such as an aircraft is provided, having at least one first support portion for an arm of a first person and at least one second support portion for an arm of a second person wherein the first and second support portions provide different height levels.

18 Claims, 8 Drawing Sheets

ARMREST AND SEAT ARRANGEMENT COMPRISING THE SAME

CROSS-REFERENCE TO RELATED APPLICATIONS

Priority is claimed to European Patent Application No. 14152804.2, filed on Jan. 28, 2014, the entire disclosure of which is hereby incorporated by reference herein.

FIELD

The invention relates to an armrest for arrangement between two seats, especially two passenger seats of a vehicle such as an aircraft.

BACKGROUND

In aircrafts, but also in other vehicles such as collective transport vehicles like buses or trains or in theatres or the like, there are seat arrangements wherein two neighboring seats share an armrest. Especially in the economy class of aircrafts a "fight for the armrest" is often a cause for discomfort of the passengers.

The design of a seat armrest has usually fixed dimension including the armrest width. Today an aircraft cross section is designed to accommodate multiple seat blocks. The space offered to the passenger in transversal direction is often given by the width between armrests, which airlines want to maximize, by reducing aisle or armrest width.

SUMMARY

An aspect of the invention provides an armrest configured for arrangement between two seats, the armrest comprising: a first support portion configured for an arm of a first person; and a second support portion configured for an arm of a second person, wherein the first and second support portions provide different height levels.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1a is a schematic view of one of the armrests between the seats in a closed position;

FIG. 1b is a schematic view of one of the armrests between the seats in an open position;

DETAILED DESCRIPTION

Figure 1:
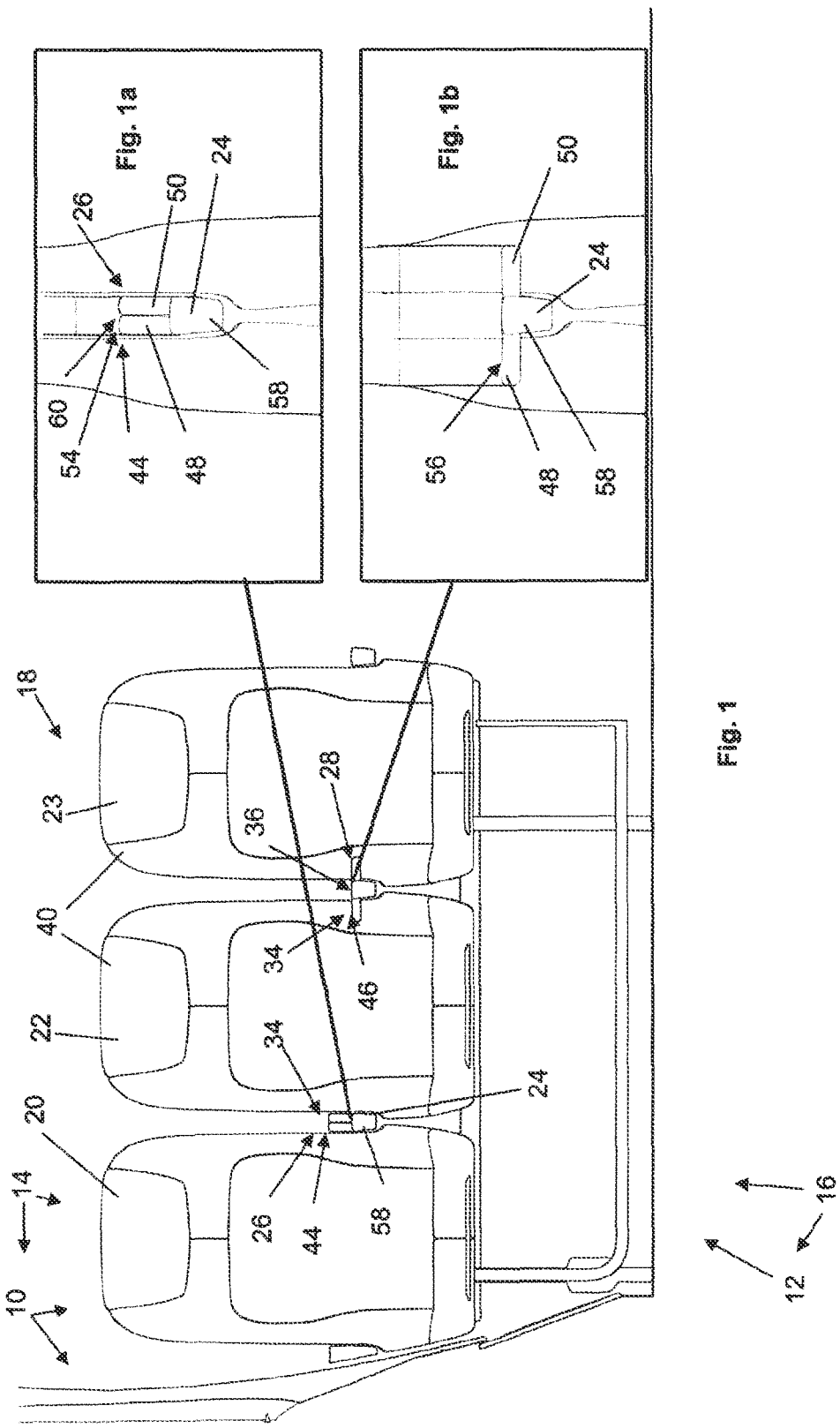
FIG. 1 is a schematic view of a part of a cabin of an aircraft with a seat arrangement comprising armrests between the seats.

An aspect of the invention enables an arrangement of more seats in a seat row within a given space. Another object of the invention is to provide more comfort without enlarging a space between the seats.

A seat arrangement, especially a passenger seat arrangement, with such an armrest according to the invention or according to preferred embodiments thereof as well as a passenger compartment such as an aircraft cabin with such an seat arrangement are indicated in the further independent claims. A further aspect addresses an aircraft provided with such seat arrangement.

One preferred aspect of the invention proposes a transformable armrest to fulfill both needs:
increased lateral space for passenger when seated, and
preserve the capability to increase the comfort of the armrest. The two adjacent passengers will not fight to find a place on the armrest.

According to one aspect, the invention provides an armrest for arrangement between two seats, especially two passenger seats of a vehicle such as an aircraft, comprising at least one first support portion for an arm of a first person and at least one second support portion for an arm of a second person wherein the first and second support portions provide different height levels.

Preferably, the armrest is adjustable to provide different height levels of the first and second support portions.

A preferred embodiment of the invention provides an armrest for arrangement between two passenger seats of a vehicle, especially an aircraft, comprising at least one first support portion for a passenger's arm and at least one second support portion for a passenger's arm wherein the first and second support portions are adjustable to different height levels.

Preferably, the first and second support portion are arranged one after another in a longitudinal direction of the armrest.

Preferably, at least one of the supporting portions is adjustable in height and/or in width.

Preferably, at least one of the supporting portions comprises at least one wing element or lid being pivotally movable in an upward position to enlarge the height of the supporting portion and in a downward position to enlarge the width of the support portion.

Preferably, the at least one supporting portion comprises a first lid and a second lid pivotally movable in counter rotation manner between their upward and downward positions.

Preferably, the first and second lids are arranged and/or configured in a symmetrical manner with regard to a longitudinal center plane of the arm rest.

Preferably, the at least one lid is pivotable around a pivot axis wherein at least a component of the axis direction extends in longitudinal direction of the armrest.

Preferably, the at least one lid has a narrower first arm support surface extending in a tangential direction with regard to the pivot movement of the lid and a wider second arm support surface that extends parallel to a radial direction with regard to the pivot movement of the lid.

A further aspect of the invention provides a seat arrangement for a vehicle, especially an aircraft, with a first seat and an adjacent second seat, characterized by an armrest according to the first aspect of the invention or according to the preferred embodiments thereof. This armrest is preferably arranged in the middle between the first and second passenger seats.

Preferably, the armrest is pivotally linked so that it can pivot between an essentially vertical arm rest position and an essentially horizontal arm rest position.

According to a further aspect, the invention relates to a passenger compartment, especially aircraft cabin, comprising at least one of such seat arrangements.

According to a further aspect, the invention relates to an aircraft comprising at least one of such seat arrangements.

By using an armrest according to the invention, it is even possible to decrease a space between adjacent passenger seats without lowering the comfort of the passengers sharing an armrest.

For example, the seat arrangement of the invention makes it possible to arrange more seats in a row as compared with today's seat arrangements. For example, on a main deck of an Airbus A380, it is possible to have 11 seats in a row instead of 10.

One preferred embodiment of the invention provides a foldable armrest.

A solution to have more seats in a row is the specific configuration of the armrest.

Preferably, the upper surface of the armrest has at least two levels for the arms of the two passengers sitting side by side.

For example, the upper surface of the front part of the armrest is elevated relative to the upper surface of the back part. In this way one passenger can put his arm on the elevated front part, while his neighbor can put his arm on the relatively lower back part.

Preferably, the part forming the elevated surface comprises two pieces or plates oriented in parallel which can be unfolded, thus building a broad surface which is enough for carrying the arms of both passengers. The pieces can be turned around an axis which is oriented in a length direction of the armrest, to change from a position where both plates are vertically oriented and in parallel, to a position where both plates are horizontally oriented.

An aspect of the invention has the advantage to solve the perennial problem of fighting for elbowroom in high-density seating in passengers compartments.

A further advantage is to provide individual space for the arms of both persons seating at either side of the device without increasing the width of the division.

In closed position, a dual-user armrest allows adjacent passengers to both use the armrest thanks to its two levels. A preferred embodiment provides a unique two levels individual armrest that allows two persons to share an armrest in places such as the aircraft cabin, cars, boats, trains, bus or theatres.

In open position the proposed armrest also makes more efficient use of space by creating a few extra inches or centimeters for passengers, as well as eliminating the "battle for the armrest" that is a major source of irritation and discomfort for many in economy class.

A preferred design is based on ergonomic consideration to reconcile the need to offer maximum space to the passenger between two consecutive armrests and comfortable support for arm and elbow in different positions of two adjacent passengers.

Today typical armrest width in economy class is between 4.45 cm and 5.7 cm (1.75 and 2.25 inches), a preferred embodiment of the proposed invention offers a means to transform them to about 10 cm to about 15 cm (4 to 6 inches) and vice-versa.

FIG. 1 shows a schematic view of a part of the interior of a cabin 10 of an aircraft 12 as example for a passenger compartment 14 of a vehicle 16, comprising a seat arrangement 18. The seat arrangement 18 has several seats 20, 22, 23 with arm-rests 24 arranged between adjacent seats 20, 22 and 22, 23, respectively. The armrest 24 can also be arranged on both sides of a single seat or on both sides of the outer seats 20, 23 of the seat row 18.

The armrest 24 between a first seat 20 and a second seat 22 is shown in a closed position 26. The armrest 24 between the second seat 22 and the third seat 23 is shown in an open position 28. The closed position 26 is shown in more detail in FIG. 1a, while the open position 28 of the armrest 24 is shown in more detail in FIG. 1b.

Figure 2:
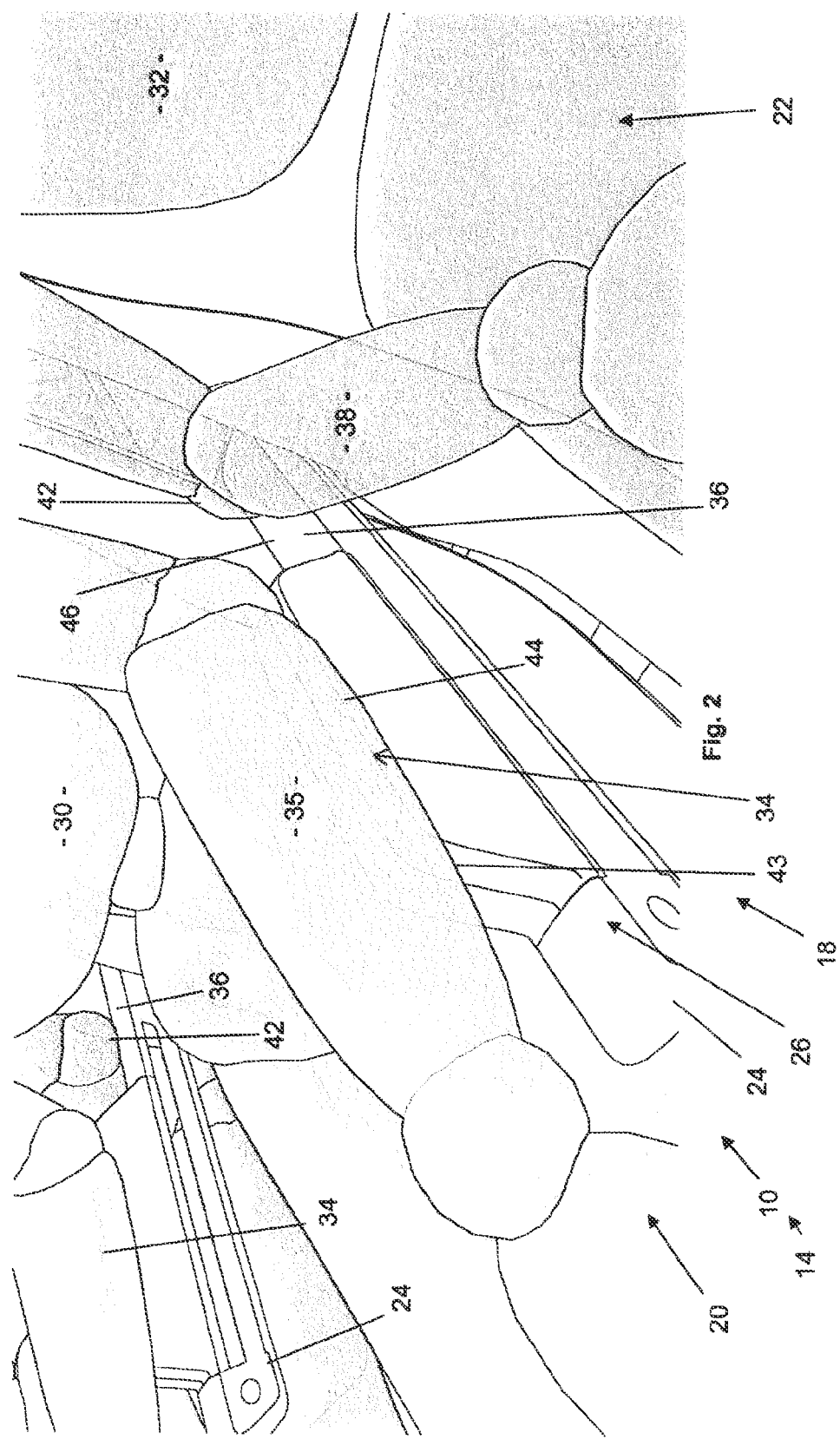
FIG. 2 is a schematic perspective view of the seat arrangement with the armrest in the closed position in use by passengers.
Figure 3:
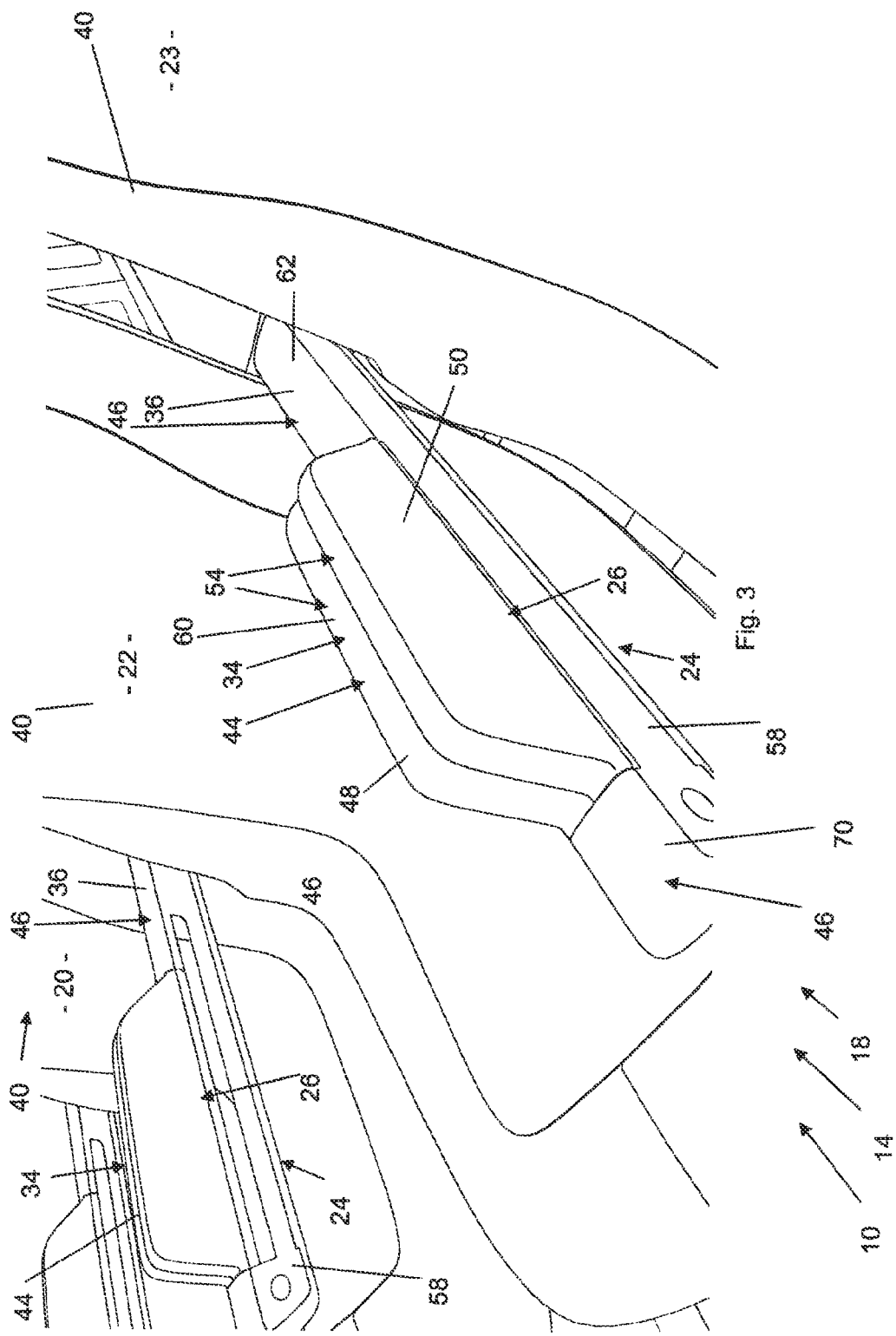
FIG. 3 shows a view similar to FIG. 2, without the passengers, to illustrate a closed position step of deployment of the armrest.

The armrest 24 in the closed position is shown in more detail in FIGS. 2 and 3. FIG. 2 shows the situation when the seat arrangement 18 is occupied by neighboring passengers 30, 32. FIG. 3 shows the seat arrangement 18 with the armrests 24 between the seats 20, 22; 22, 23 in the closed position 26 without passengers.

As visible from FIGS. 2 and 3, the armrest 24 provides a first portion 34 for supporting the arm 35 of the first passenger 30 and a second support portion 36 for supporting the arm 38 of the neighboring second passenger 32.

The second support portion 36 is a backward portion that is arranged closer to the back rests 40 of the seats 20, 22, 23, while the first support portion 34 is arranged on a more forward portion or front portion. The support portions 34, 36 are arranged one after another in longitudinal direction of the armrest 24. The second support portion 36 is located between the first support portion 34 and the back rest 40.

The first support portion 34 has, at least in the closed position 28, a different height level as the second support portion 36. In the embodiment shown, the first support portion 34 which is more forward has a higher level as the second support portion 36.

Further, the armrest 24 has a tip portion 70 at the free forward end having preferably the same height level as the second support portion 36.

As visible from FIG. 2, the second passenger 32 can support his elbow 42 on the second support portion 36, while the first passenger 30 can rest his forearm 43 on the first support portion 34.

The first support portion 34 is adjacent to the second support portion 36 and both support portions 34, 36 do not overlap.

The first support portion 34 is longer than the second support portion 36.

Hence, while the armrest 24 is quite narrow and takes only a small space between the seats 22, 23; 20, 22, it provides two different height levels 44, 46 which give more space for the arms 35, 38 of the passengers 30, 32.

Figure 4:
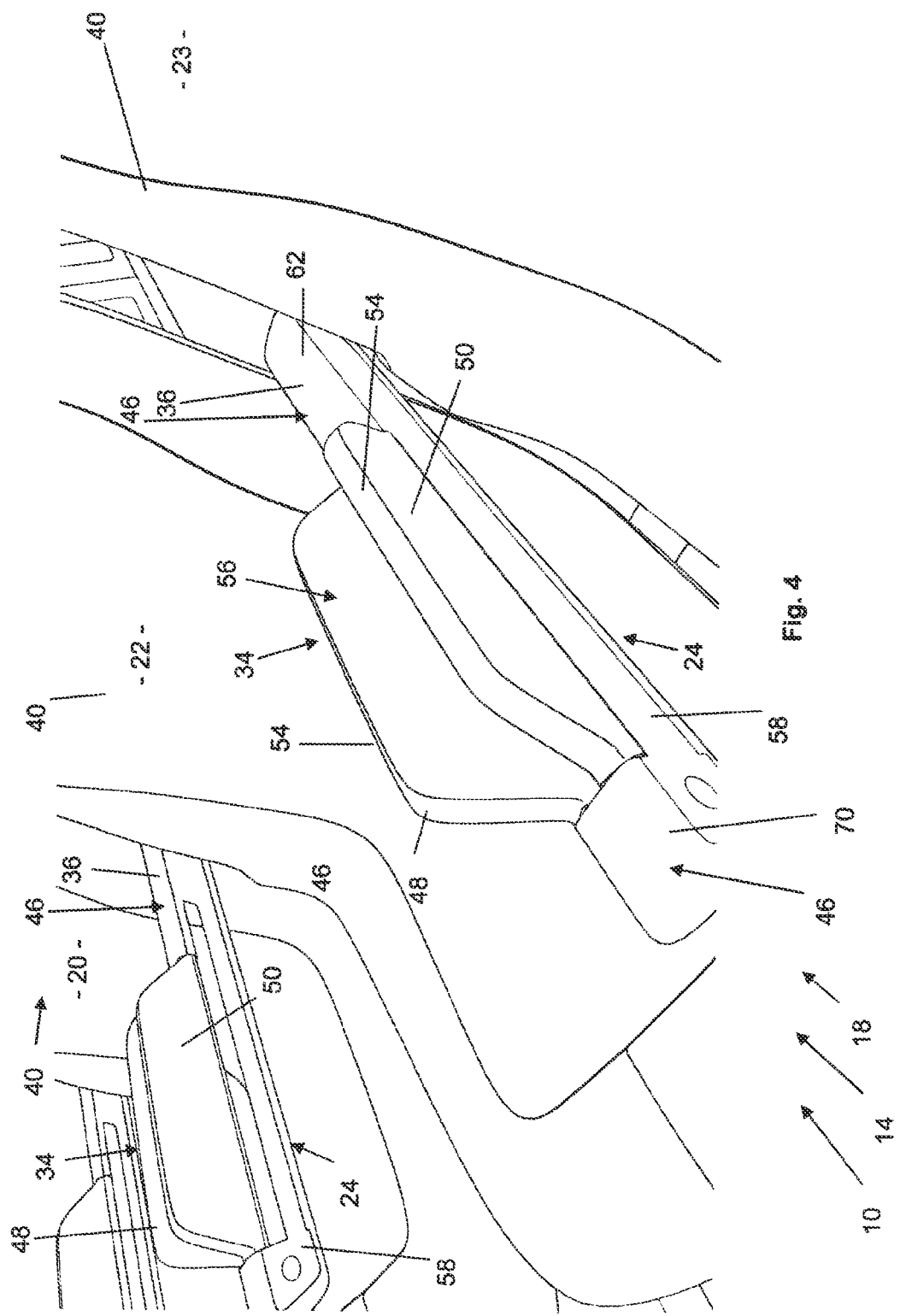
FIG. 4 shows a view similar to FIG. 2, without the passengers, to illustrate a different step of deployment of the armrest between a closed position as shown in FIG. 3 and an open position as shown in FIG. 7.
Figure 5:
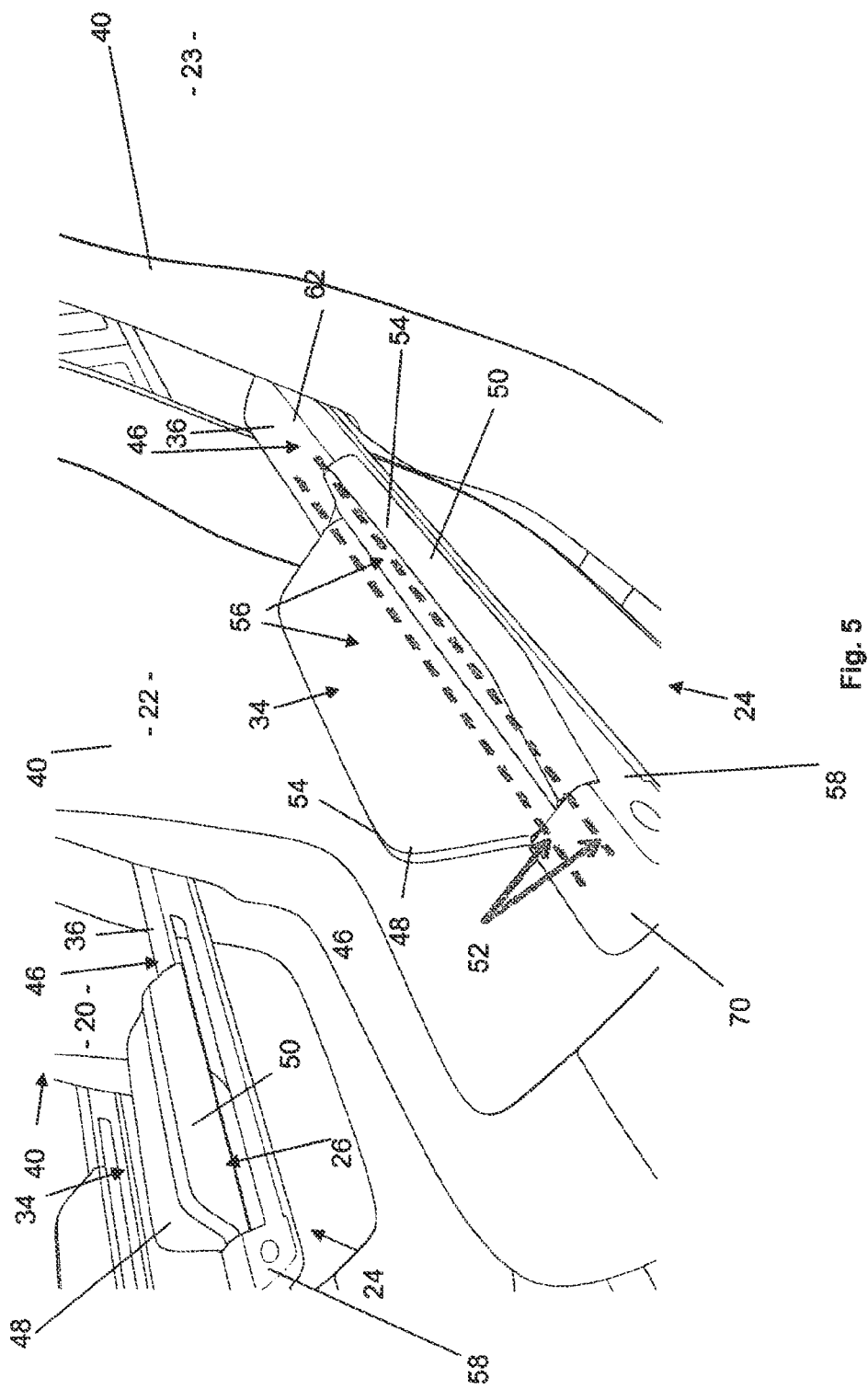
FIG. 5 shows a view similar to FIG. 2, without the passengers, to illustrate a different step of deployment of the armrest between a closed position as shown in FIG. 3 and an open position as shown in FIG. 7.
Figure 6:
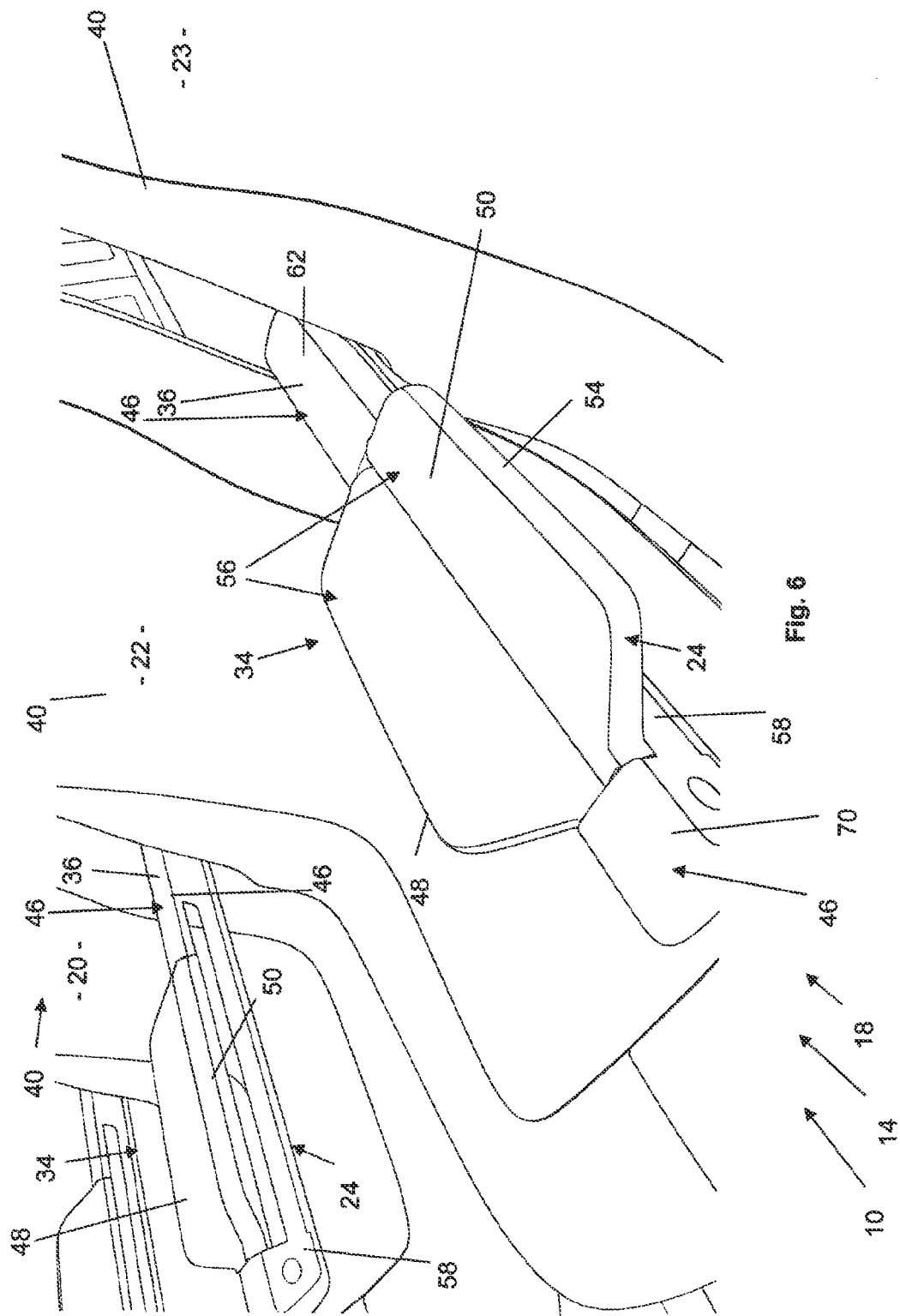
FIG. 6 shows a view similar to FIG. 2, without the passengers, to illustrate a different step of deployment of the armrest between a closed position as shown in FIG. 3 and an open position as shown in FIG. 7.
Figure 7:
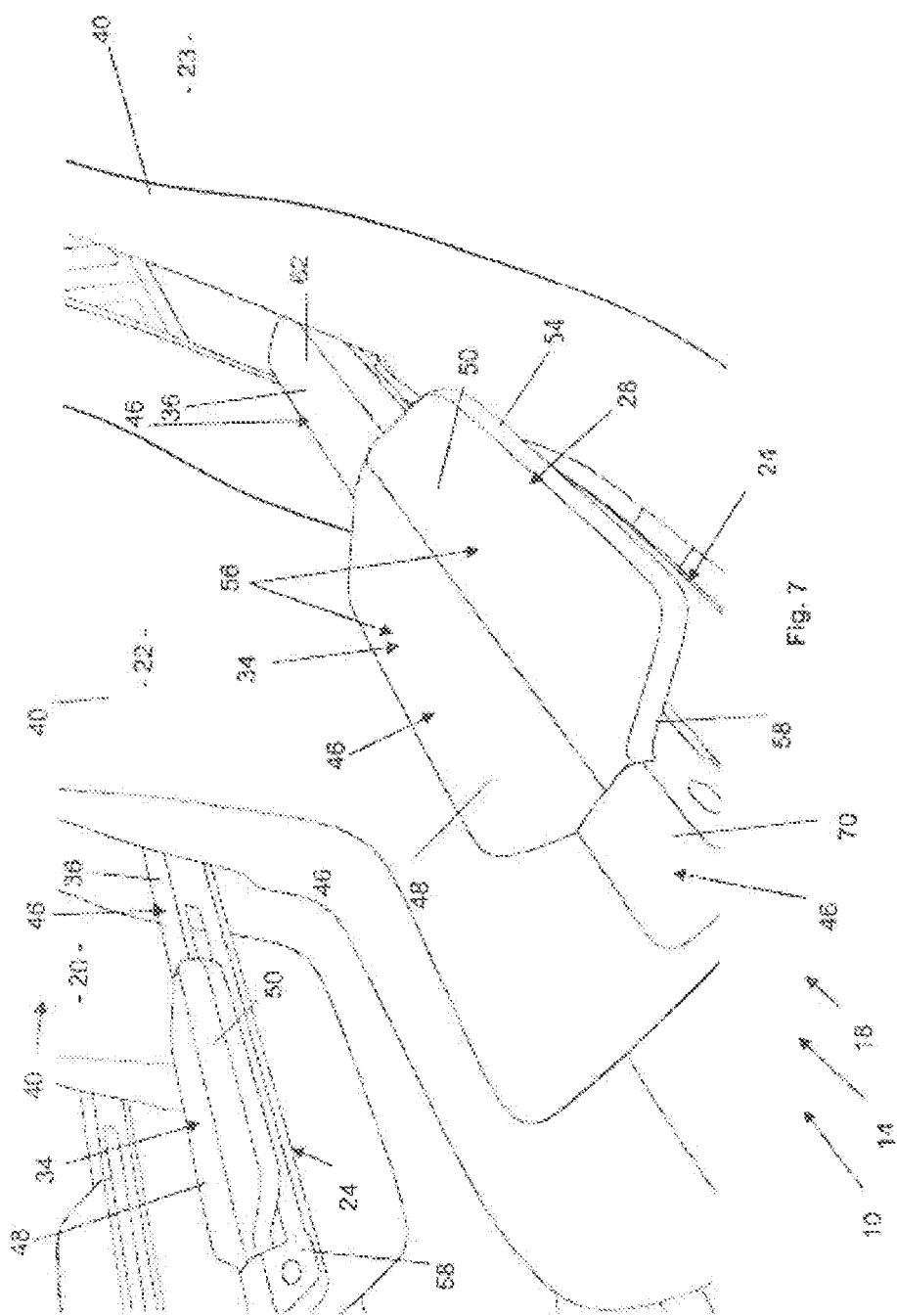
FIG. 7 shows a view similar to FIG. 2, without the passengers, to illustrate an open position step of deployment of the armrest.

As visible from FIGS. 3 to 7, the armrest 24 can be unfolded from the closed position 26 as shown in FIG. 3 into an open position 28 as shown in FIG. 7; intermediate positions are shown in FIGS. 4 to 6.

In the open position 28, the first support portion 34 has the same height level 46 as the second support portion 36, but has a larger width.

As visible from FIGS. 3 to 7, the first support portion 34 comprises a first wing or lid 48 and a second wing or lid 50. The lids 48, 50 are pivotally movable about parallel pivot axes 52 extending into the longitudinal direction of the armrest 24.

It is also possible that both lids 48, 50 are formed and arranged in a way that they have only one common axis 52 for their pivot movement or that only one of the lids 48, 50 is pivotally movable about one single axis 52. In the latter case, only one of the lids 48, 50 can be opened and thus moved in the horizontal position, while the remaining lid remains in the vertical position and thus provides privacy between the passengers.

Both lids 48, 50 have a narrower first arm support surface 54 arranged on the smaller side of the lid 48, 50 and extending, hence, in a tangential direction with regard to the pivot axis 52. Further, both lids 50 have a wider second arm support surface 56 on the wider surface of the lid 48, 50.

The at least one axis 52 for the pivot movement of the lids 48, 50 is arranged in the bottom portion of the lids 48, 50 when they are in the closed or vertical position. That means, during unfold movement into the open or horizontal position, the lids 48, 50 and in particular the surfaces 54 at the lateral end of each lid 48, 54 being on the opposite side of the one or two axes 52 move downward.

Both lids 48, 50 are plate-shaped members pivotally linked to a base body 58 of the armrest 24 on one of the edges thereof while the first arm support surface 54 is located on the second, free-edge of the lid 48, 50. The second arm support surface 56 extends parallel to a radial direction with regard to the pivot axis 52.

Figure 8:
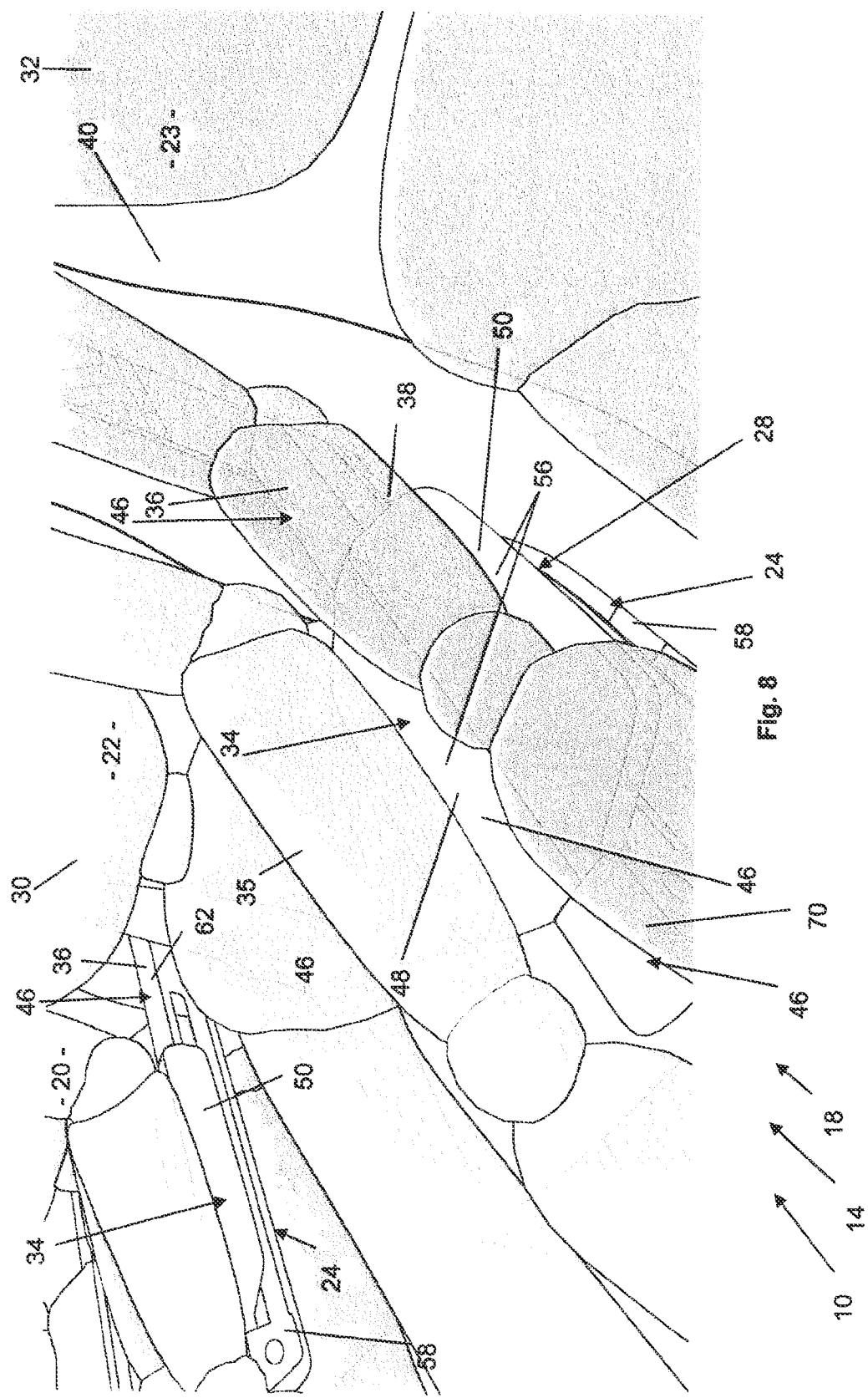
FIG. 8 is a view similar to FIG. 7 with the armrest in an open position in use by passengers.

In the closed position 26, both first arm support surfaces 54 of the two lids 48, 50 form together a first platform 60 having the upper height level 44 of the first support portion 34. In the open position 28, any second arm support surface 56 can be used by the respective passenger 30, 32, as shown in FIG. 8. In the unfolded position (open position 28), both second arm support surface 56 provide a much wider arm support surface in the lower height level 46. Preferably, the lower height level 46 of the first support portion 34 has the same height level as the second support portion 36.

The distance between the surfaces 54 of the two lids 48, 50 in the open position, i.e. the width of the support surface 56, is larger than the width of the second sup-port portion 36.

As further visible from FIGS. 3 to 8, the lids 48, 50 are configured symmetrically with regard to a central longitudinal plane through the armrest 24. Both lids 48, 50 can be pivoted in a counter-rotating manner around their respective pivot axis 52.

While the seat arrangement 18 and the armrest 24 to be used therein has been described using the example of a cabin 10 of an aircraft 12, similar armrests 24 and similar seat arrangements 18 can also be used in other vehicles 16 or in buildings, for example in buses, on boats, in trains or in theatres or cinemas or the like.

Further, the whole armrest 24 is pivotally fixed between the back rests 40 so that the whole armrest 24 can be pivoted in an essentially vertical position (not shown) or in the horizontal position as shown in the figures.

FIG. 2 shows the armrest 24 in the closed position 26. The armrest 24 provides two separate platforms 60, 62 at two levels 44, 46 which are used as individual arm-rests. This gives each passenger 30, 32 its own wider armrest and the freedom of choice without increasing the width of the division 18.

FIGS. 3 to 7 show the deployment of the armrest 24. The armrest 24 is changed from the closed position 26 as shown in FIGS. 2 and 3 to the open position 28 as shown in FIGS. 7 and 8.

FIG. 8 shows the open position 28 in use by two neighboring passengers 30, 32. The open position 28 provides horizontal surface 56 for two arms 35, 38. The dual-user armrest 24 allows adjacent passengers 30, 32 to both use the armrest 24 thanks to its new shape design in closed position 26 (e.g. FIG. 2 or 3). On open position 28 the armrest 24 also makes more efficient use of space by creating a few extra centimeters for passengers 30, 32, as well as eliminating the "battle for the armrest" that is a major source of irritation and discomfort for many in economy class.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS 10 cabin
12 aircraft
14 passenger compartment
16 vehicle
18 seat arrangement
20 first seat
22 second seat
23 third seat
24 armrest
26 closed position
28 open position
30 first passenger
32 second passenger
34 first support portion 35 arm (first passenger)
36 second support portion
38 arm (second passenger)
40 back rest
42 elbow
43 forearm
44 upper height level
46 lower height level
48 first lid
50 second lid
52 pivot axis
54 first arm support surface
56 second arm support surface
58 base body of the armrest
60 first platform
62 second platform
70 tip portion

The invention claimed is:

1. An armrest configured for arrangement between two seats, the armrest comprising:
 a first support portion configured for an arm of a first person; and
 a second support portion configured for an arm of a second person,
 wherein the first support portion comprises a first lid and a second lid that are pivotally movable about at least one pivot axis, both the first lid and the second lid including a first arm support surface that together form the first support portion at a first height level and a second arm support surface, wherein pivoting the first lid and second lid causes the second arm support surfaces to form the first support portion at a second height level, and
 wherein the second support portion is at the second height level.

2. The armrest of claim 1, wherein the first and second support portions are arranged one after another in a longitudinal direction of the armrest.

3. The armrest of claim 1, wherein the first support portion is adjustable in width.

4. The armrest of claim 1,
 wherein moving the first support portion from the first height level to the second height level enlarges a width of the first support portion.

5. The armrest of claim 4, wherein the first lid and the second lid are pivotally movable in a counter rotation manner with regard to one another.

6. The armrest of claim 5, wherein the first and second lids are arranged in a symmetrical manner with regard to a longitudinal direction of the armrest.

7. The armrest of claim 4,
 wherein the at least one pivot axis extends in a longitudinal direction of the armrest.

8. The armrest of claim 4, wherein the first arm support surfaces extend in a tangential direction with regard to the at least one pivot axis, and the second arm support surfaces extend parallel to a radial direction with regard to the at least one pivot axis, and
 wherein the first arm support surfaces are narrower than the second arm support surfaces.

9. The armrest of claim 1, configured for a two passenger seat of a vehicle.

10. The armrest of claim 1, configured for a two passenger seat of an aircraft.

11. The armrest of claim 1, wherein at least one of the support portions is adjustable in width.

12. A seat arrangement for a vehicle, the arrangement comprising:
 a first seat;
 an adjacent second seat; and
 the armrest of claim 1 arranged in the middle between the first and second seats.

13. The seat arrangement of claim 9, wherein the armrest is pivotally linked so that the armrest can pivot between an essentially vertical arm rest position and an essentially horizontal arm rest position.

14. A passenger compartment, comprising the seat arrangement of claim 8.

15. An aircraft, comprising the passenger compartment of claim 14.

16. An aircraft, comprising the seat arrangement of claim 12.

17. An armrest configured for arrangement between two seats, the armrest comprising:
 a first support portion configured for an arm of a first person; and
 a second support portion configured for an arm of a second person,
 wherein the first support portion is at a first height level and the second support portion is at a second height level,
 wherein at least one of the support portions includes a first lid,
 wherein the first lid is pivotally movable to an upward position to enlarge a height of the at least one support portion,
 wherein the first lid is pivotally movable to a downward position to enlarge a width of the at least one support portion, and
 wherein the at least one support portion includes a second lid that is pivotally movable to an upward position to enlarge the height of the support portion and pivotally movable to a downward position to enlarge the width of the support portion, the first and second lids being pivotally movable in a counter rotation manner with regard to one another.

18. The armrest of claim 17, wherein the first and second lids are arranged, configured, or arranged and configured in a symmetrical manner with regard to a longitudinal center plane of the armrest.

* * * * *